(12) United States Patent
Shinya et al.

(10) Patent No.: US 7,969,032 B2
(45) Date of Patent: Jun. 28, 2011

(54) WINDMILL ROTATION DETECTION/MANAGEMENT DEVICE AND WIND POWER GENERATION SYSTEM

(75) Inventors: Tsutomu Shinya, Ise (JP); Sachiko Shinya, legal representative, Ise (JP); Masashi Kutsuna, Ise (JP); Takeo Ito, Ise (JP); Masami Morita, Ise (JP); Hiroki Kataoka, Ise (JP); Hiroaki Nishiono, Ise (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 0 days.

(21) Appl. No.: 12/884,710

(22) Filed: Sep. 17, 2010

(65) Prior Publication Data
US 2011/0042951 A1 Feb. 24, 2011

Related U.S. Application Data

(63) Continuation of application No. PCT/JP2009/055429, filed on Mar. 19, 2009.

(30) Foreign Application Priority Data

Mar. 21, 2008 (JP) ................................. 2008-074659

(51) Int. Cl.
*H02P 9/48* (2006.01)
(52) U.S. Cl. ................................ 290/44; 290/55; 322/37
(58) Field of Classification Search ................ 290/7, 43, 290/44, 54, 55; 322/28, 37
See application file for complete search history.

(56) References Cited

U.S. PATENT DOCUMENTS

| 4,868,406 | A | * | 9/1989 | Glennon et al. | 290/4 R |
|---|---|---|---|---|---|
| 4,908,565 | A | * | 3/1990 | Cook et al. | 322/10 |
| 6,346,797 | B1 | * | 2/2002 | Perreault et al. | 322/29 |
| 6,998,723 | B2 | * | 2/2006 | Kong et al. | 290/1 C |
| 7,141,887 | B2 | * | 11/2006 | Okubo et al. | 290/44 |
| 7,394,166 | B2 | * | 7/2008 | Teichmann et al. | 290/44 |
| 7,586,205 | B2 | * | 9/2009 | Krueger | 290/44 |
| 7,586,216 | B2 | * | 9/2009 | Li et al. | 307/151 |
| 2010/0207396 | A1 | * | 8/2010 | Simon | 290/55 |
| 2010/0329652 | A1 | * | 12/2010 | Gregg et al. | 392/497 |

FOREIGN PATENT DOCUMENTS

| EP | 1 945 946 | 7/2008 |
|---|---|---|
| JP | 64-090000 | 4/1989 |
| JP | 2005-130651 | 5/2005 |
| JP | 2005-295633 | 10/2005 |
| JP | 3978186 B2 | 9/2007 |
| WO | WO 03/058062 A1 | 7/2003 |
| WO | WO 2007/053036 A1 | 5/2007 |

* cited by examiner

*Primary Examiner* — Nicholas Ponomarenko
(74) *Attorney, Agent, or Firm* — Oblon, Spivak, McClelland, Maier & Neustadt, L.L.P.

(57) ABSTRACT

An apparatus comprising: a first input that receives a first rotational speed information of a windmill mechanically generated by a mechanical rotation detection unit; a second input that receives a second rotational speed information of the windmill based on an alternating current output of a generator attached to the windmill; and a controller configured to compare the first and second rotational speed information, to determine whether a difference between the first and second rotational speed information is greater than a predetermined value and to execute a predetermined anomaly processing in response to the difference being greater than the predetermined value.

11 Claims, 7 Drawing Sheets

WINDMILL ROTATION DETECTION/MANAGEMENT DEVICE AND WIND POWER GENERATION SYSTEM

CROSS REFERENCES TO RELATED APPLICATIONS

This application is a continuation application of International Application No. PCT/JP2009/055429, filed Mar. 19, 2009, the entire contents of which are incorporated herein by reference. PCT/JP2009/055429 claims priority to JP 2008-074659, filed Mar. 21, 2008.

TECHNICAL FIELD

The present invention relates to a windmill rotation detection/management device and a wind power generation system, which are capable of appropriately utilizing rotation count information for management of over-rotation or the like, while increasing reliability of windmill rotation detection.

BACKGROUND ART

A wind power generation system utilizing a windmill is generally provided with: a windmill body for receiving a wind and generating torque; and a generator for generating electric power by means of the torque generated in the windmill body. In such a windmill, there is a possibility that appropriate charging cannot be performed depending upon whether a wind is heavy or gentle. Therefore, in Patent Document 1 or the like, a power line for transmitting an alternating current output of a generator is connected to a battery via a controller which is a power management device for performing power management.

The controller performs power management such as circuit switching according to power at the time of rectifying an alternating current output of the generator and performing battery charging or power management at the time of supplying power to an alternating current load via an inverter. At this time, controls are effected such that: rotation count information taken out from the windmill via a rotational speed detector which is a mechanical detecting unit is inputted via an input line; damping is applied at the time of over-rotation in a controller; a clutch is provided at a position at which the windmill's generator is disconnected from windmill body's rotary shaft so as to disconnect the clutch at the time of a gentle wind; and ON/OFF is switched for a battery charge circuit. Such a controller is generally commercially available as a discrete device.

[Patent Document 1] Japanese Patent Application Laid-open No. 2005-130651

DISCLOSURE OF THE INVENTION

[Problem(s) to Be Solved by the Invention]

However, a mechanical detection unit such as a rotational speed detector is failure-prone. Thus, once a failure occurs if a rotation control system is configured exclusively depending upon a mechanical detection unit such as the abovementioned control device, rotation information cannot be acquired and power management cannot be appropriately performed.

Some of the controllers of such type never employ windmill rotation count information for the sake of cost reduction and structural simplification; and therefore, it is desired that there should be a means which is capable of effectively handling rotation count information at a high reliability merely by adding a simple configuration.

The present invention has been made in view of the above-described problem, and it is an object of the present invention to provide a windmill rotation detection/management device and a wind power generation system, which are capable of increasing reliability of detection of the number of windmill rotations, or alternatively, subsidizing a controller, which is incapable of processing the number of windmill rotations, so as to make effective utilization of windmill rotation count information.

[Means for Solving the Problem(s)]

In order to achieve the above-described object, the present invention takes the following means.

That is, a windmill rotation detection/management device according to the present invention is applied to a windmill having a windmill body for receiving a wind and then generating torque and a generator for generating electric power by means of the torque generated in the windmill body, and is characterized by comprising: a first input line for inputting rotation count information taken out from the windmill via a mechanical detection unit; a second input line for inputting rotation count information taken out from an alternating current output of the generator via an electrical detection unit; and anomaly processing means for executing predetermined anomaly processing in a case where it is determined that there is a rotational difference equal to or greater than a predetermined value in comparison with items of the rotation count information inputted through both of the input lines.

A windmill has its specific structure that, when the windmill receives a wind and then a windmill rotates, an alternating current in a period according to the number of the windmill rotations is outputted from a generator. Therefore, windmill rotation count information can be electrically detected from an alternating current output line thereof, with almost no need to upgrade a power generation system. Further, in comparison of this rotation count information with the rotation count information that is obtained from a mechanical detection unit such as a speed detector, it can be determined whether or not appropriate outputs are made at both of the detection units, and if there is a rotational difference, it becomes possible to provide earlier handling of an anomaly in the anomaly processing means. In particular, in a case where power management such as damping, release or charge switching of the windmill is performed utilizing the mechanical detection unit, expansion of damage due to incorrect control can be prevented; and it also becomes possible to readily build a state in which efficient power management is performed under the control of highly reliable, double items of rotation count information, by reasonably adding required elements or parts to the one that performs power management without employing rotation count information.

In this case, in view of the fact that a generator has its own distinctive characteristic that an appropriate alternating current waveform is not outputted unless a certain degree of rotations is reached, it is desirable that a determination threshold value be set at a voltage level of an alternating current output of the generator; and if the voltage level then exceeds the determination threshold value, to configure the anomaly processing means to perform comparison/determination of the rotation count information so as to eliminate incorrect determination.

In protecting a wind power generation system including a windmill from being damaged, it becomes effective to allow the anomaly processing means to be configured to perform at least processing of applying rotational damping by shunting an output terminal of the generator.

In a wind power generation system to which the windmill rotation detection/management device is applied, in a case where a power line for transmitting the alternating current output of the generator is connected to a power accumulation unit or a commercially available power source via a power management device for performing charging or utility interaction and other management, an intermediate terminal is set on a power line between the generator and the power management device; a short circuit for shunting and releasing the intermediate terminal is connected to the intermediate terminal; the short circuit is usually maintained in a released state; and the anomaly processing means is configured to shunt the intermediate terminal by outputting an anomaly processing signal, thereby making it easy to retrofit to the wind power generation system.

In a wind power generation system to which the windmill rotation detection/management device is applied, in a case where a power line for transmitting the alternating current output of the generator is connected to a power accumulation unit or a commercially power source via a power management device for performing charging or utility interaction and other management, and then, the power management device is configured to input, via an input line, rotation count information taken out from the windmill via the mechanical detection unit, it is convenient to configure the first input line, utilizing the input line of the power management device. Where the power management device is provided with a short circuit for shunting and releasing an output terminal of the generator, based upon the rotation count information, it is more effective if the anomaly processing means is configured to output an anomaly processing signal to the short circuit so as to shunt the output terminal of the generator.

In a wind power generation system to which the windmill rotation detection/management device is applied, in a case where a power line for transmitting the alternating current output of the generator is connected to a power accumulation unit or a commercially power source via a power management device for performing charging or utility interaction and other management, and then, the power management device is adapted to perform management thereof, without acquiring rotation count information of the windmill, a unit structure is provided in such a manner enabling a mechanical detection unit configuring the first input line to be further retrofitted, thereby making it possible to apply the present invention more easily.

In view of the fact that it is difficult to clarify a cause of an anomaly merely by applying damping to windmill rotations, it is desirable that there should be configured as follows. That is, the windmill rotation detection/management device according to the present invention, when applied to a windmill having a windmill body for receiving a wind and then generating torque and a generator for generating electric power by means of the torque generated in the windmill body, is characterized by comprising: a mechanical detection unit and an electrical detection unit, for detecting a rotation count of the windmill; an anomaly processing means for performing processing for applying damping to the windmill, based upon rotation count information taken out via the detection units; and a display unit for displaying an indication which is capable of notifying a fact that the damping operation has been performed because there is a possibility that at least one of the detection units or the generator fails in association with the damping operation.

The windmill rotation detection/management device according to the present invention is configured as described above. Thus, a wind power generation system is provided with this windmill rotation detection/management device, thereby making it possible to effectively improve reliability or safety and the like, of the wind power generation system.

[Advantageous Effect(s) of the Invention]

According to the present invention, as described above, windmill rotation count information can be simply and effectively detected through an electrical methodology in consideration of a windmill-specific structure. Therefore, there can be provided a novel effective windmill rotation detection/management device and wind power generation system, which are capable of earlier detecting a mechanical detection fault or a generator anomaly and the like and then quickly taking required action, such as the subsequent rotation damping stop, by comparing the above-detected rotation count information with rotation count information from a mechanical detection unit.

BEST MODE FOR CARRYING OUT THE INVENTION

Hereinafter, one embodiment of the present invention will be described referring to the drawings.

Figure 1:
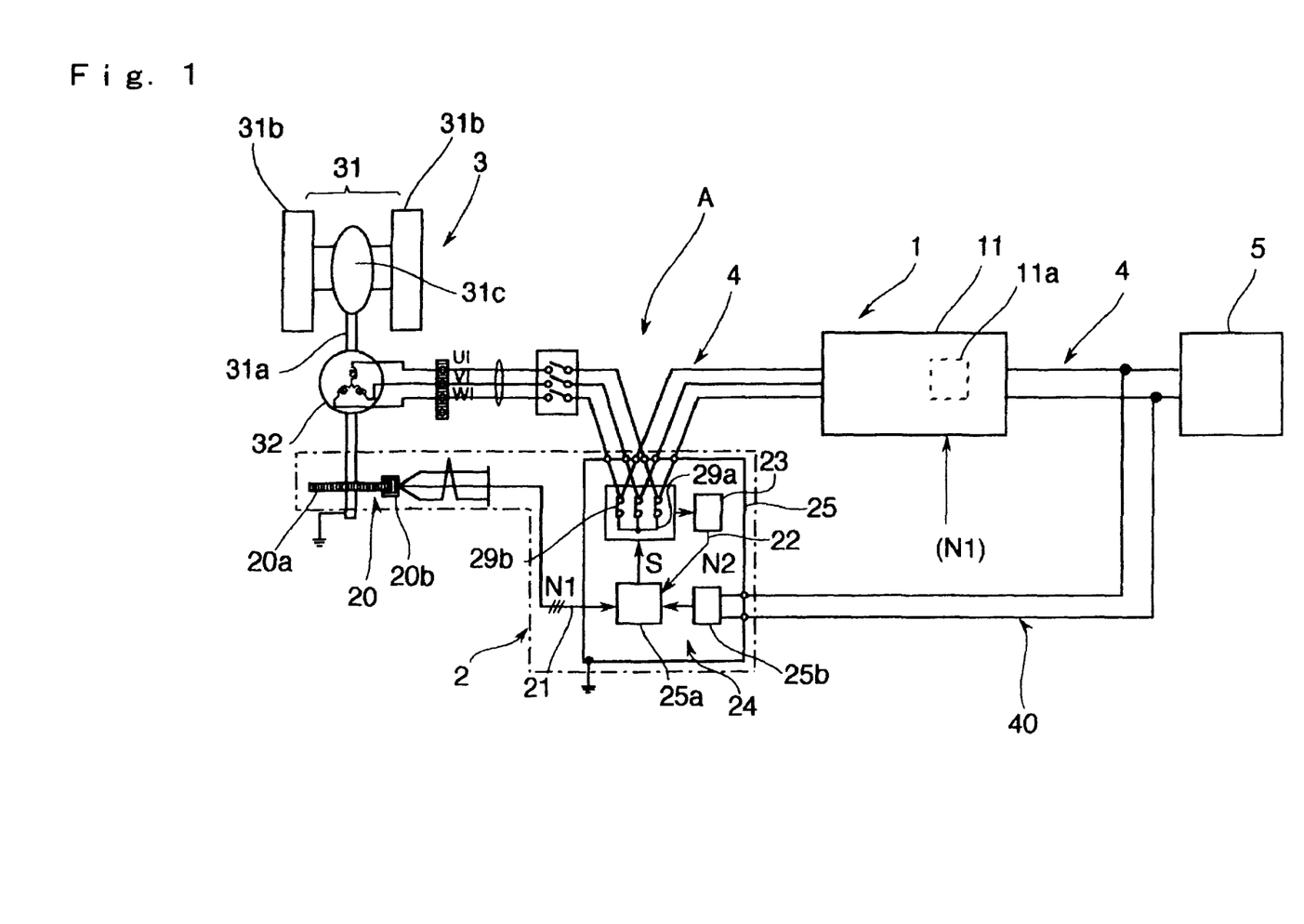
[FIG. 1] It is a view of a system configuration of an entire wind power generation system to which a windmill rotation detection/management device according to one embodiment of the present invention is applied.

FIG. 1 shows a configuration in which a windmill rotation detection/management device 2 according to the embodiment is added to a wind power generation system A in which power management is achieved by a power management device 1 so as to subsidize a rotation detection function of a windmill 3.

The windmill 3 is provided with: a windmill body 31 for receiving a wind and generating torque; and a generator 32 for generating electric power by means of the torque generated in the windmill body 31. As illustrated, this windmill is of a vertical-shaft type such that a rotary shaft 31$a$ of the windmill body 31 is actuated in a vertical direction, namely such that a wind direction and the rotary shaft 31$a$ are substantially orthogonal to each other; and the generator 32 is generally accommodated in a support unit 31$c$ for supporting a blade 31$b$ of the windmill body 31. Of course, the windmill targeted to be applied, of the present invention, is not limitative to those of such a vertical shaft type, and may be of a horizontal wing type such that a rotary shaft of the windmill is actuated in a horizontal direction, namely in a state in which a wind direction and the windmill's rotary shaft are substantially parallel to each other.

Figure 4:
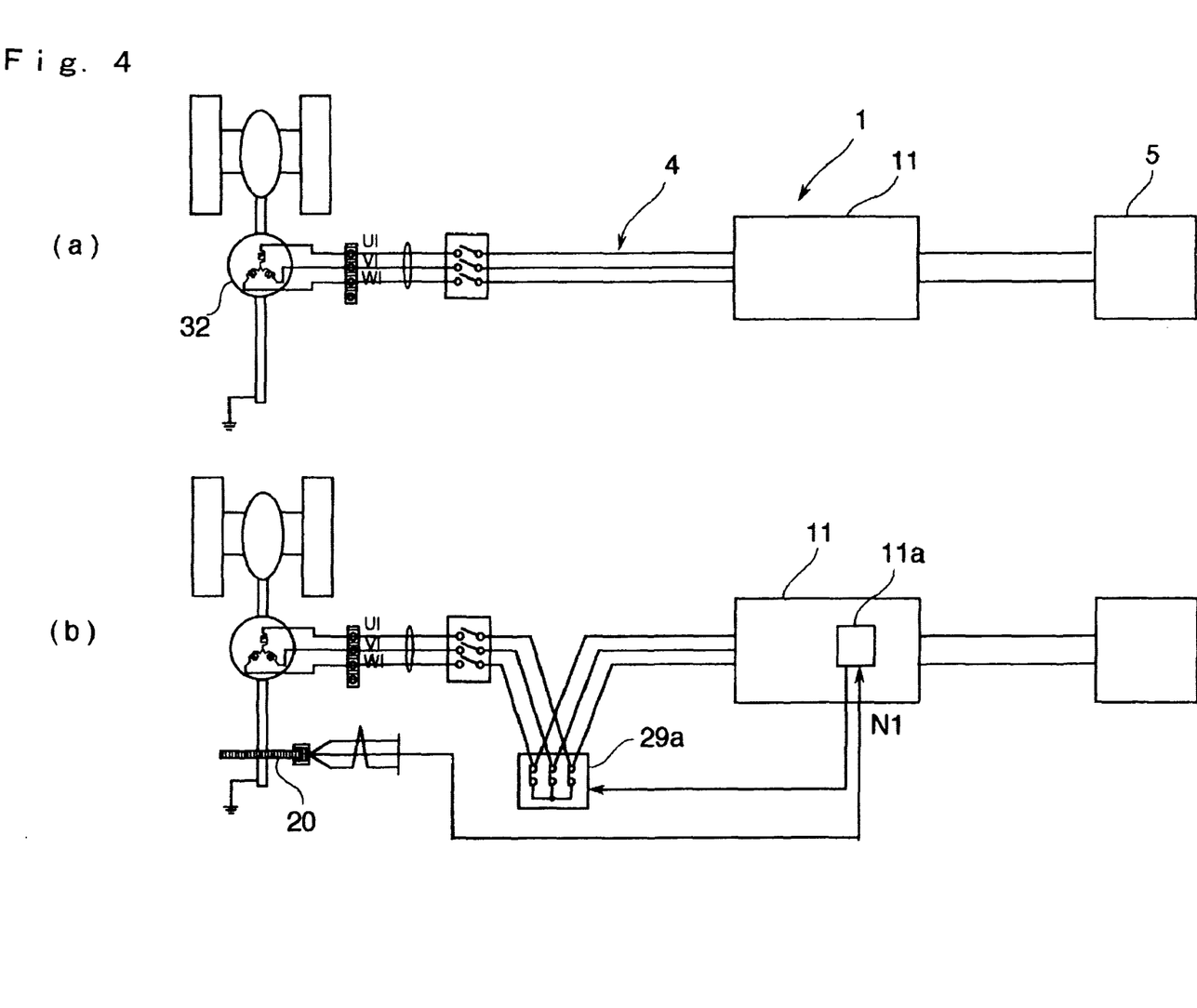
[FIG. 4] It is a view showing an exemplary configuration of a wind power generation system to which the above device is to be applied.

A wind power generation system A is configured so that a battery 5 is connected to a power line 4 for transmitting a three-phase alternating current output from the generator 32 via a main controller 11 configuring the power management device 1. The generator 32 generates a voltage which is substantially proportional to the number of rotations, and the main controller 11 manages a power converter for rectifying the alternating current output of the generator 32 to charge the battery 5 or manages a power converter or the like, for supplying power to an external alternating current load via an inverter, although not shown. This main controller also controls power generation and performs other management. This matter is similar to the existing configuration shown in FIG. 4(*a*).

Figure 2:
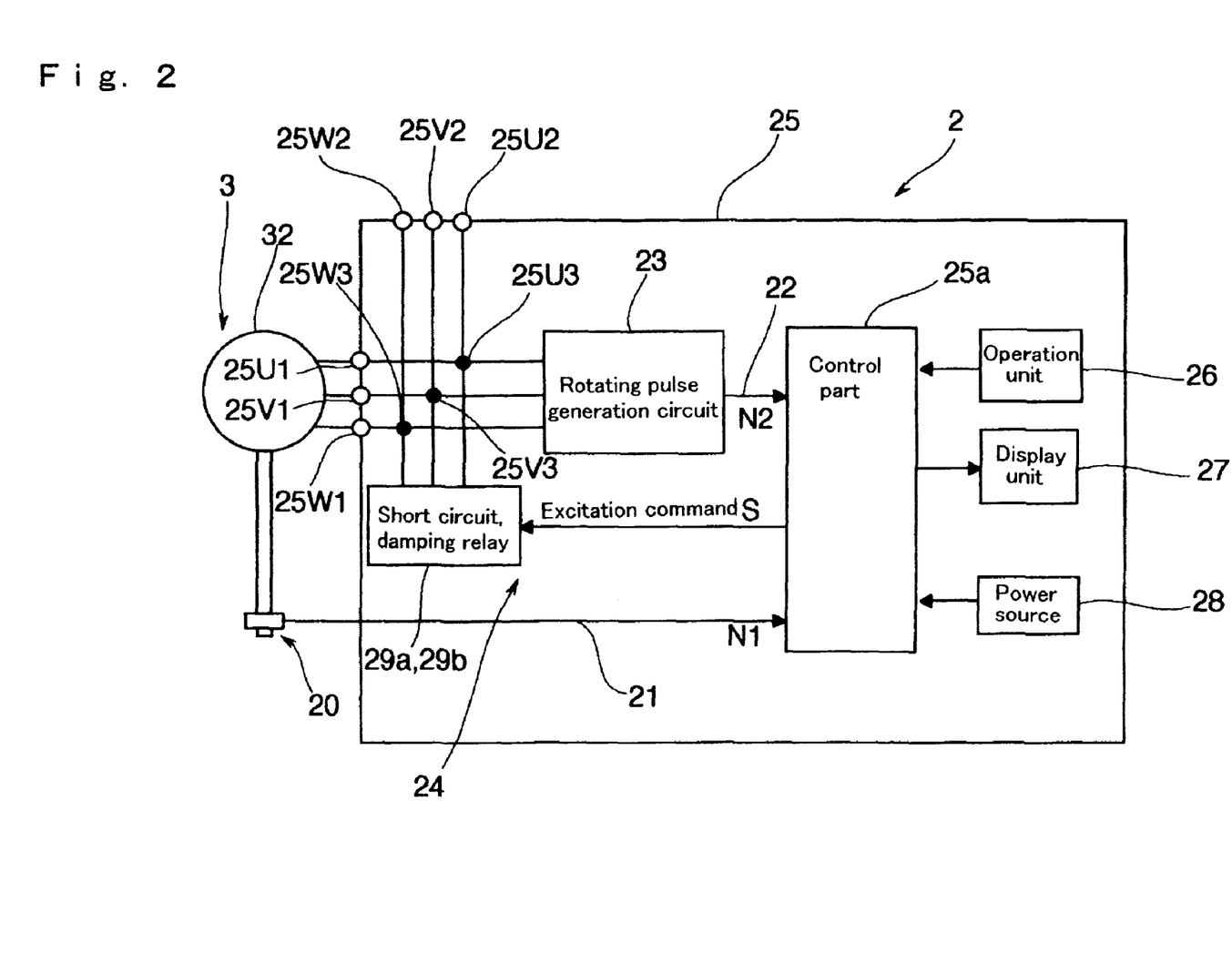
[FIG. 2] It is a block diagram depicting a configuration of the windmill rotation detection/management device according to the embodiment.

On the other hand, the windmill rotation detection/management device 2 of the embodiment, as shown in FIG. 2 or the like, is provided with: a first input line 21 for inputting first rotation count information N1 taken out from the windmill 3 via the rotational speed detector 20 which is a mechanical detection unit; a second input line 22 for inputting second rotation count information N2 taken out from an alternating current output of the generator 32 via a rotating pulse generation circuit 23 which is an electrical detection unit; and anomaly processing means 24 for executing predetermined anomaly processing in a case where it is determined that there is a rotational difference equal to or greater than a predetermined value N0 by comparing rotation count information N1 and N2 inputted through both of these input lines 21 and 22.

The anomaly processing means 24 forms a main body of an auxiliary controller 25 having a control part 25*a*; this auxiliary controller 25 is provided with a three-phase input terminals 25U1, 25V1, 25W1 and a three-phase output terminals 25U2, 25V2, 25W2; and as shown in FIG. 1 and FIG. 2, the three-phase input terminals 25U1, 25V1, 25W1 are connected to the generator 32 and the three-phase output terminals 25U2, 25V2, 25W2 are connected to the main controller 11, respectively. The three-phase input terminals 25U1, 25V1, 25W1 and the three-phase output terminals 25U2, 25V2, 25W2 are connected at internal contact points (contact points functioning as intermediate terminals in the embodiment) 25U3, 25V3, 25W3 of the auxiliary controller 25.

The rotational speed detector 20 is configured to mount a slit plate 20*a* at a position rotating integrally with the rotary shaft 31*a* of the windmill 3, for example, so as to allow a pickup device 20*b* to be opposed to this slit plate 20*a* and then output a pulse voltage every time a slit provided in the slit plate 20*a* passes from the pickup device 20*b*. This detector forms a unit structure which can be readily retrofitted to the existing rotary shaft 31*a* of the windmill 3. Further, the pulse voltage is inputted as the first rotation count information N1 to the control part 25*a* in the auxiliary controller 25 via the first input line 21.

The rotating pulse generation circuit 23 is configured to input a three-phase alternating current outputted from the generator 32 so as to generate a pulse voltage therefrom through a publicly known appropriate circuit, for example, a pulse frequency f of which is $f=(N \times P)/120$ where the number of polls is P and the number of rotations is N (rpm). An appropriate circuit is a circuit for detecting an alternating current voltage outputted from the generator 32 and then generating one pulse voltage in at least one period of an alternating current voltage. As one example, there can be provided a circuit for outputting a high-level voltage at an interval at which a positive voltage is outputted and a low-level voltage at an interval at which a negative voltage is outputted, and specifically, this pulse voltage can be generated utilizing a comparator or a photo-coupler. This pulse voltage is also inputted as the second rotation count information N2 to the control part 25*a* in the auxiliary controller 25.

In order to improve controllability, resolution of detection for one rotation can be increased by adding a rectification circuit and a pulse generation circuit so as to generate a pulse frequency 2f for a single-phase full-wave rectification, a pulse frequency 3f for a three-phase half-wave rectification, or a pulse frequency 6f for a three-phase full-wave rectification.

The control part 25*a* is configured with a general microprocessor made of a CPU, a memory and an interface. In the memory, a program for determining at least rotational anomaly and then executing the required anomaly processing is stored in advance, and a CPU execute predetermined processing by loading the program from the memory as required. Of course, such processing may be implemented by only hardware such as a dedicated circuit other than software. An operation unit 26 or a display unit 27 made of an LED or an LCD is connected to the control part 25*a* of the embodiment and a power source 28 is connected thereto; and operation information such as an operation command or an operation mode is inputted from the operation unit 26 to the control part 25*a* such that a display signal for displaying an operational state or anomaly indication and the like is outputted from the control part 25*a* to the display unit 27. In the power source 28, in order to utilize an output of the power management device 11 or the battery 5, the power line 4 therebetween is connected to a DC/DC converter 25*b* in the controller 25 via an auxiliary power line 40 (see FIG. 1).

Figure 3:
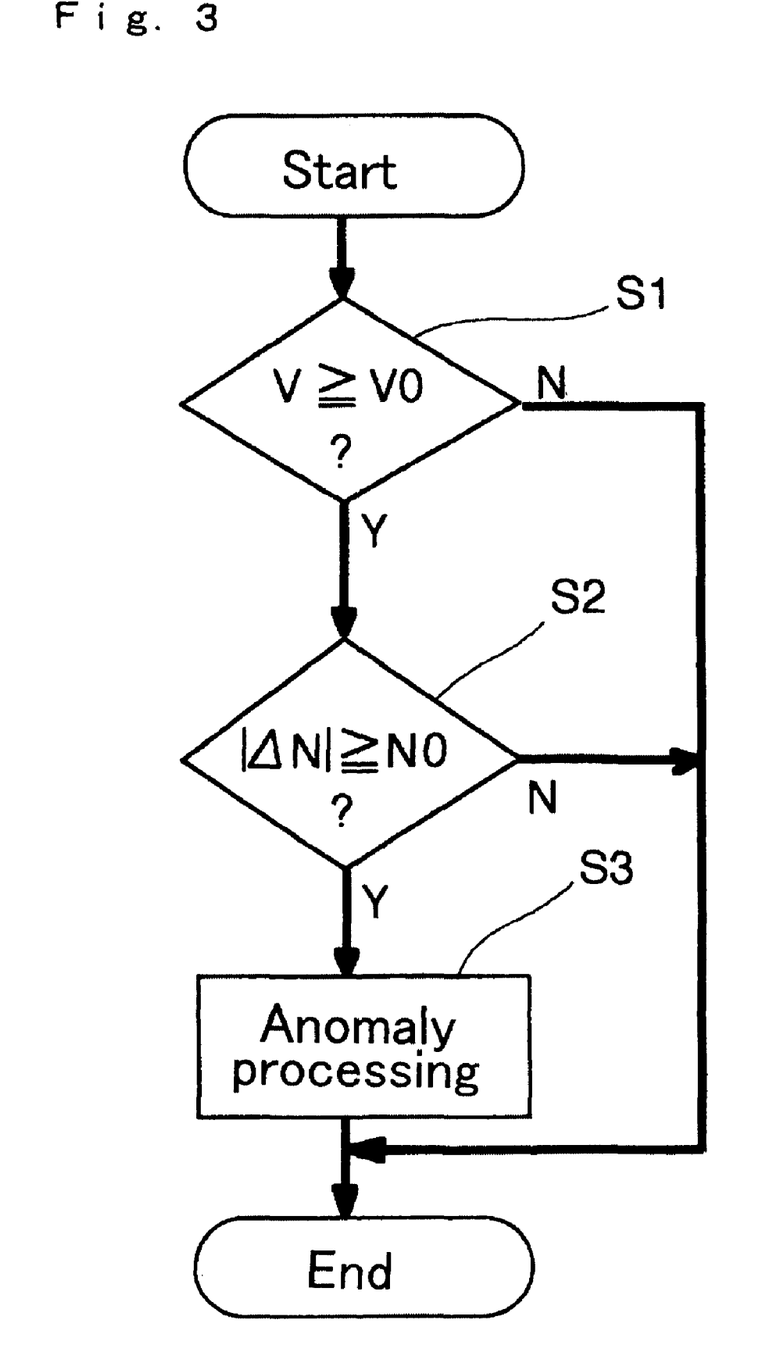
[FIG. 3] It is a flowchart illustrating actuation of the windmill rotation detection/management device.

FIG. 3 is a flowchart illustrating an outline of processing in a case where the control part 25*a* functions as anomaly processing means 24. First, a determination threshold value V0 is set at a voltage level V of an alternating current output of the generator 32; it is determined whether or not the voltage level V exceeds the determination threshold value V0 (step S1); and if it is exceeded, the routine migrates to anomaly determination processing. Two items of rotation count information N1 and N2, which are inputted from both of the input lines 21, 22, are then compared with each other. In this case, with the pulse frequencies of the inputted pulses being dealt as rotation counts, these rotation counts may be directly compared with each other, or alternatively, after the pulse frequencies are converted to voltages by means of an F/V circuit, these converted voltages may be compared with each other. Further, it is compared whether or not the magnitude of a rotational difference $\Delta N$ between the rotation count based upon the rotation count information N1 detected from the rotational speed detector 20 which is a mechanical detection unit and the one based upon the rotation count information N2 detected from the rotating pulse generation circuit 23 which is an electrical detection unit is a predetermined value N0 or more (step S2); if the comparison result is YES, it is determined as anomaly, and anomaly processing is executed (step S3). The abovementioned predetermined value N0 is set at an appropriate value such that the fact that a rotational difference occurs can be detected earlier and reliably without being affected by an error.

For the sake of the anomaly processing, a short circuit 29*a* for shunting the internal contact points 25U3, 25V3, 25W3 and a damping relay 29*b* for disconnecting the short circuit 29*a* and the internal contact points 25U3, 25V3, 25W3 from each other are provided in the auxiliary controller 25 shown in FIG. 1 and FIG. 2. The damping relay 29*b* is configured to be set to "Open" in an ordinary state or to be switched to "Closed" when an excitation command S is inputted, so as to shunt between the three phases at the output side of the generator 32.

The control part 25*a* outputs the excitation command S which is an anomaly processing signal to the damping relay 29*b* in a case where an anomaly determination is made, thereby shunting the output side of the generator 32 to generate a large load upon the generator 32 so as to rotationally damp and stop the windmill 3. Together with these functions, this controller causes the display unit 26 to display the fact that a sensor anomaly occurs. An operator can take action such as earlier inspection of rotational speed detector 20 in view of the fact that the windmill 32 has been rotationally damped and stopped and the display content.

Of course, a rotational difference ΔN equal to or greater than a predetermined value N0 can occasionally arise as to the rotation count information N1, N2 obtained from both of the input lines 21, 22 because the rotational speed detector 20 is normal and the generator 32 is abnormal; and therefore, a display indicating a possibility of anomaly or the like associated with the generator 32 can be included as an anomaly determination result. For example, if a faulty site can be estimated according to the content of the rotational difference ΔN such as the fact that in a case where a possibility that the second rotation count information N2 detected in the second input line 22 is higher in comparison with the first rotation count information N1 detected in the first input line 21, there is a high possibility that the rotational speed detector 20 fails, or alternatively, in the reverse case, there is a high possibility that a power anomaly such as no rated voltage outputted from the generator 32 occurs, such faulty sites may be displayed more specifically, or alternatively, they may be displayed in sequential order from a site suspected to have the highest possibility that such an anomaly occurs. Of course, the higher rotation count of the windmill 3 is, the higher frequency the second rotation count information N2 (pulse) outputted from the rotating pulse generation circuit 23 becomes. Therefore, it is possible to handle only the second rotation count information N2 as over-rotation detection information.

Figure 5:
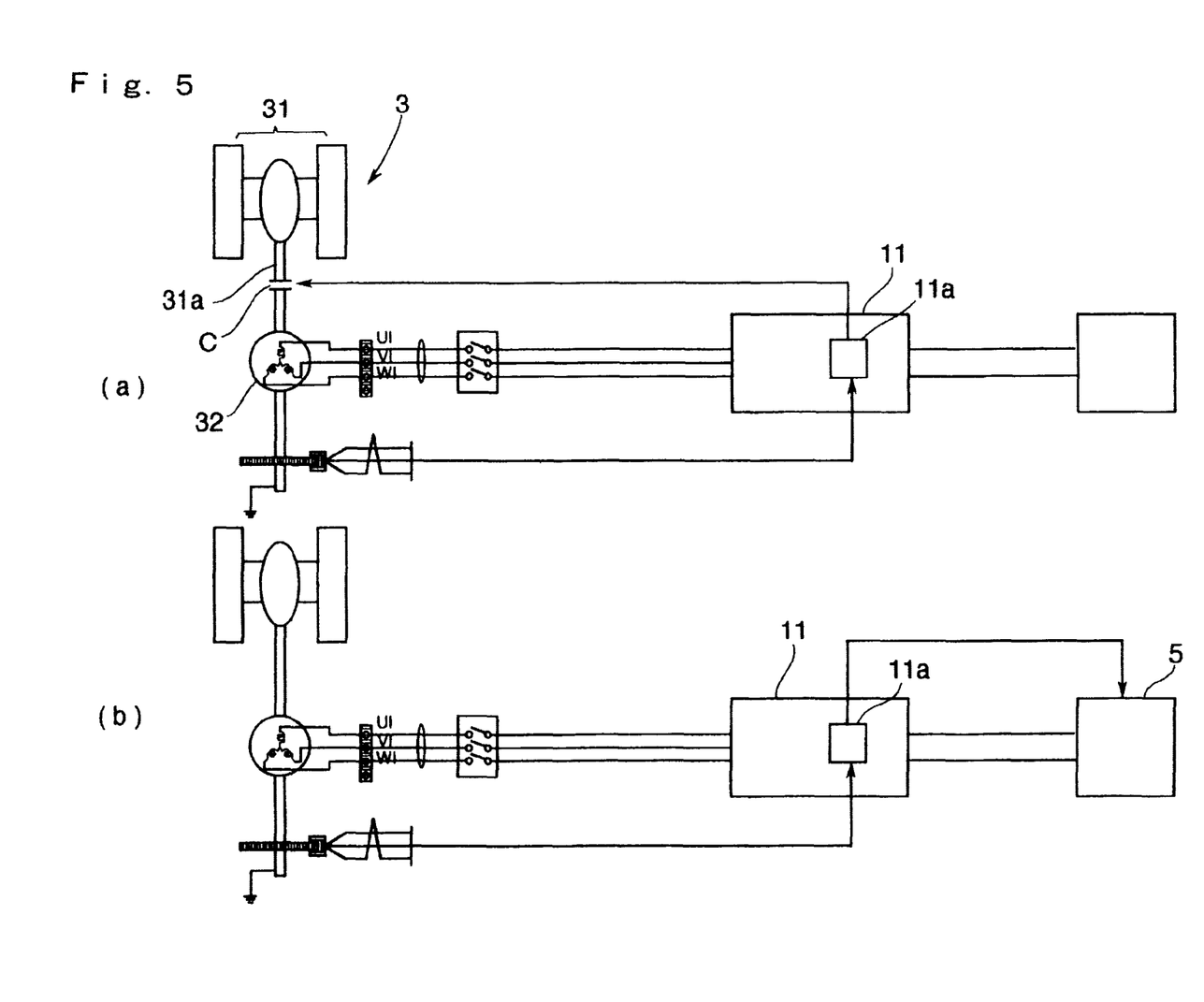
[FIG. 5] It is a view showing another exemplary configuration of the wind power generation system to which the above device is to be applied.
Figure 6:
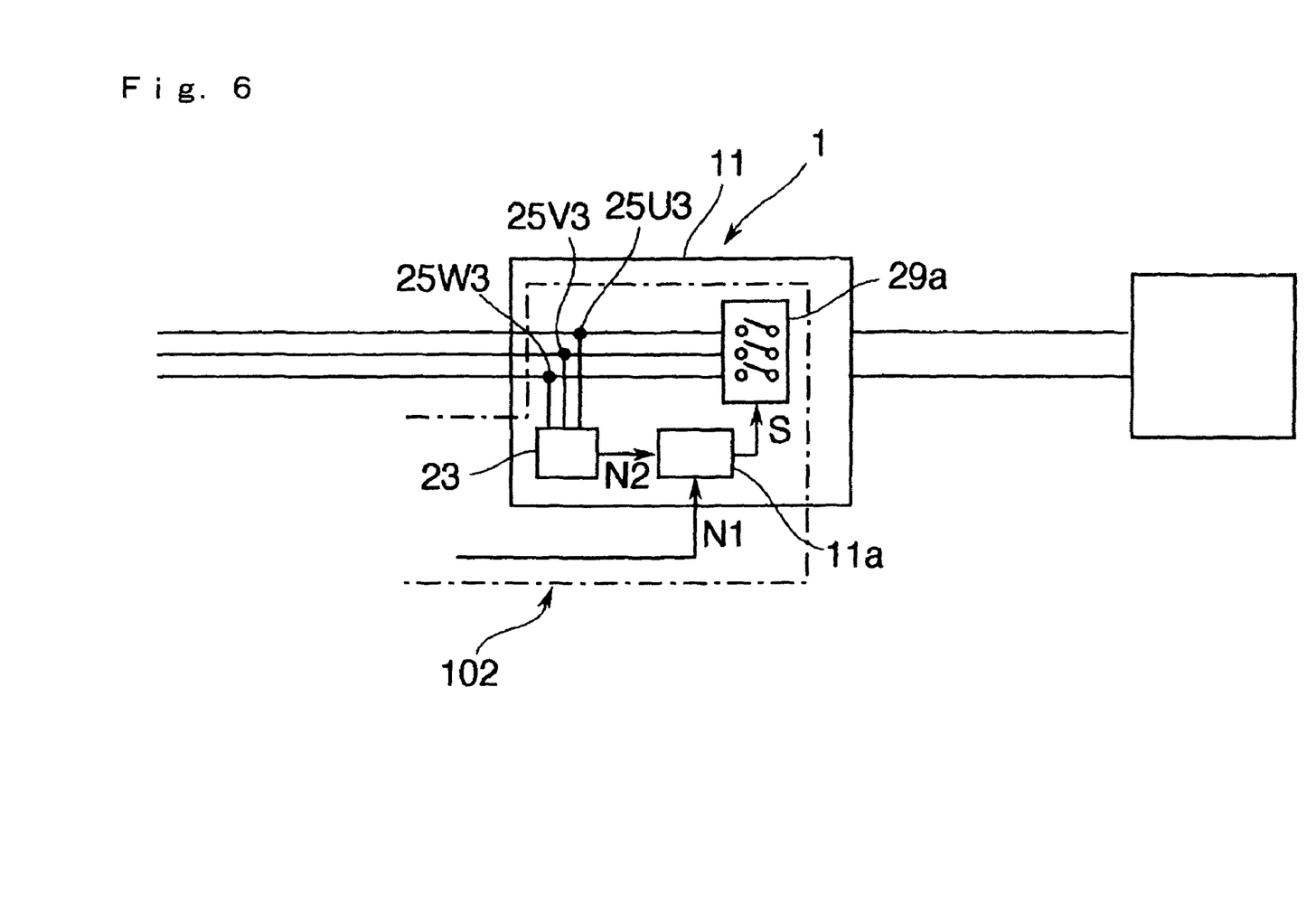
[FIG. 6] It is a view showing an exemplary modification of the embodiment.

As far as an interrelationship between the power management device 1 and the main controller 11 are concerned, as is already described, there is the one of type shown in FIG. 4(b), which utilizes the first rotation count information N1 for the sake of power management; and there is the one of type shown in FIG. 4(a), which does not utilizes the first rotation count information N1. In a case where the main controller 11 is of the type shown in FIG. 4(b), which utilizes the first rotation count information N1, as disclosed in Patent Document 1 as well, controls are effected such that: the first rotation count information N1 taken out from the windmill 3 via the rotational speed detector 20 which is a mechanical detection unit is inputted ; a short circuit 29a for shunting the output side of the generator 32 is provided to apply damping through the short circuit 29a at the time of over-rotation in the control part 11a of the main controller 11; a clutch C for disconnecting the generator 32 of the windmill 3 from the rotary shaft 31a of the windmill body 31, as shown in FIG. 5(a), so as to disconnect the clutch at the time of a gentle wind; or a charge quantity for the battery 5 is operated in accordance with an operational state of the windmill 3, as shown in FIG. 5(b). Where the main controller 11 is thus already provided with a control part 11a or an input line corresponding to the first input line 21 mentioned previously, the first input line 21 configuring the windmill rotation detection/management device 2 of the embodiment may be utilized by drawing its related input line that already exists. Further, apart from externally adding the auxiliary controller 25 as shown in FIG. 1, a program required for the control part 11a may be written to allow the control part 11a in the main controller 11 to work as the control part 25a of the embodiment. In this case, as shown in FIG. 6, the rotating pulse generation circuit 23 is built in the main controller 11 to make connection to the internal terminals 25U3, 25V3, 25W3 which are the intermediate terminals and to the control part 11a, and if there is a short circuit 29a in the main controller 11, the excitation command S is supplied to the short circuit, whereby a windmill rotation detection/management device 102 whose configuration is equivalent to that of FIG. 1 can be achieved. Of course, it is needless to say that the most effective is initially designing a common controller, as shown in FIG. 6, having both of the functions of power management and rotation anomaly detection/management.

Alternatively, in a case where the main controller 11 that already existed is of such type shown in FIG. 4(a), which does not have the line 21 for acquiring the rotation count information N1, an auxiliary controller 25 shown in FIG. 1 is connected to the power line 4 so as to be interposed between the generator 32 and the main controller 11; the rotational speed detector 20 is retrofitted to an appropriate rotation unit of the generator 32; and power is supplied from the battery 5 to the auxiliary controller 25 via the auxiliary power line 40, whereby the configuration shown in FIG. 1 is completed.

It is also effective to provide an appropriate analog filter for cutting a high-frequency component in the second line 22, for example, so as to disallow incorrect detection or malfunction, or alternatively, to perform required software processing at the control part 25a.

As described above, to be applied to the windmill 3 having a windmill body 31 for receiving a wind and generating torque and a generator 32 for generating electric power by means of the torque generated in the windmill body 31, the windmill rotation detection/management device according to the embodiment is provided with: a first input line 21 for inputting first rotation count information N1 taken out from a windmill 3 via a rotational speed detector 20 which is a mechanical detection unit; a second input line 22 for inputting second rotation count information N2 taken out from an alternating current output of the generator 32 via a rotating pulse generation circuit 23 which is an electrical detection unit; and anomaly processing means 24 for executing predetermined anomaly processing in a case where there is a rotational difference ΔN equal to or greater than a predetermined value N0 in comparison with items of rotation count information N1 and N2 inputted through both of the input lines 21 and 22.

As already set forth, a windmill 3 has a windmill-specific structure that the windmill receives a wind and a windmill body 31 rotates, whereby an alternating current in a period according to the number of rotations thereof is outputted from a generator 32. Therefore, as illustrated, merely by adding a controller 25 to the wind power generation system that already existed and then providing appropriate wiring or the like, second rotation count information N2 of the windmill 3 can be electrically detected from a power line 4 which is an alternating current output line thereof, with almost no need to upgrade a power generation system or its relevant one. Further, in comparison of the second rotation count information N2 with the first rotation count information N1 obtained from a speed detector 20, it can be determined whether or not appropriate outputs are made at both of the detection units 20 and 23, and if there is a rotational difference ΔN, it becomes possible to provide earlier anomaly handling in the anomaly processing means 24 and then avoid a critical state such as over-rotation. In particular, in a case where a main controller 11 performs power management such as damping, releasing, or charging control of the windmill 3 by utilizing a rotational speed detector 20, expansion of damage due to incorrect control can be prevented. Further, by reasonably adding required elements or parts to the one that performs power management without using rotation count information as well, it becomes possible to readily build a state in which efficient power management is performed under the control of highly reliable, double items of rotation count information N1 and N2.

The generator 32 has its own distinctive characteristic that an appropriate alternating current waveform is not outputted unless a certain degree of rotations is reached. Therefore, in place of unlimitedly comparing and determining the rotation count information N1, N2 detected by a rotating pulse generation circuit 23 and a rotational speed detector 20, a determination threshold value V0 is set at a voltage level of an alternating current output of the generator 32; and if the voltage level exceeds the determination threshold value V0, the anomaly processing means 24 is adapted to make comparison/determination of both of the items of rotation count information N1, N2, so that a cause of an incorrect determination can be effectively eliminated. Further, even if the time of slow rotation is thus eliminated from a target of determination, such elimination never leads to inconvenience of a power generation system or its relevant one immediately.

Further, the anomaly processing means 24 is configured so as to perform processing of shunting at least an output terminal of the generator 32. Therefore, this means can be readily provided by adding a simple short circuit 29a or damping relay 29b, for example, and effective damping is applied to the generator 32, which becomes effective as a means for preventing over-rotation.

Upon constructing such a windmill rotation detection/management device 2, in a case where the wind power generation system that already existed allows the power line 4, for transmitting an alternating current output of the generator 32, to be connected to a battery 5 (or commercially available power source) which is a power accumulation unit via a power management device 11 which performs charging or utility interaction and other management, it is sufficient if the device is merely configured such that: a short circuit 29a is connected to intermediate terminals U3, V3, W3 (or U1, V1, W1 or U2, V2, W2) set on the power line 4 between the generator 32 and the power management device 1; and the excitation command S is inputted from the anomaly processing means 24 to the damping relay 29b for opening/closing the short circuit 29a. This makes it easy to retrofit to a wind power generation system, and also leads to protecting the power management device 1 from an overvoltage.

Further, in a case where the power management device 1 of the wind power generation system that already existed is of type shown in FIG. 4(b) or the like, adapted to input the rotation count information N1 taken out from the windmill 3 via the rotating speed detector 20 or the like, an input line of the power management device 1 can be utilized as a first input line 21 of the windmill rotation detection/management device 2 according to the embodiment; and therefore, a system configuration can be simply achieved merely by additionally providing the second input line 22 and the anomaly processing means 24.

Of course, in a case where the power management device 1 is provided with a short circuit for shunting or releasing an output terminal of the generator 32, based upon the first rotation count information N1, the anomaly processing means 24 may be configured to output an anomaly processing signal S1 to the short circuit so as to shunt the output terminal of the generator 32, and can be provided as the one having a simpler structure. Of course, as has been already discussed, it is also effective to allow a controller per se including a control part to be constructed integrally with the power management device 1 and the windmill rotation detection/management device 2.

In contrast to this, even in the case that the power management device 1 is of the type shown in FIG. 4(a), which is adapted to perform power management without acquiring windmill rotation count information, a unit structure is provided in a such a manner enabling the rotational speed detector 20 configuring the first input line 21 to be retrofitted. Therefore, the windmill rotation detection/management device 2 of the embodiment can be readily applied to such a wind power generation system as well.

In the foregoing description, in view of the fact that it is difficult to clarify a cause of an anomaly merely by seeing a phenomenon that damping is applied to rotation of the windmill 3, when applying the windmill 3 having a wind body 31 for receiving a wind and generating torque and a generator 32 for generating electric power by means of the torque generated in the windmill body 31 thereto, the windmill rotation detection/management device 2 according to the embodiment is provided with: a mechanical detection unit (rotating speed detector) 20 and an electrical detection unit (rotating pulse generation circuit) 23, for detecting the number of rotations of a windmill 3, anomaly processing means 24 for performing processing for the sake of applying damping to the windmill 3, based upon rotation count information N1, N2 taken out via these detection units 20, 23; and a display unit 27 for displaying an indication which can be notified that: there is a possibility that the detection units 20, 23 or the generator 32 fail(s) in association with the damping operation; and therefore, the damping operation has been performed. Hence, it becomes possible to take action at the time of damping stop more speedily and appropriately.

Since the windmill rotation detection/management device 2 according to the embodiment is configured as described above, the wind power generation system A is provided with the windmill rotation detection/management device 2, thereby making it possible to effectively improve reliability or safety and the like, of the wind power generation system A.

Figure 7:
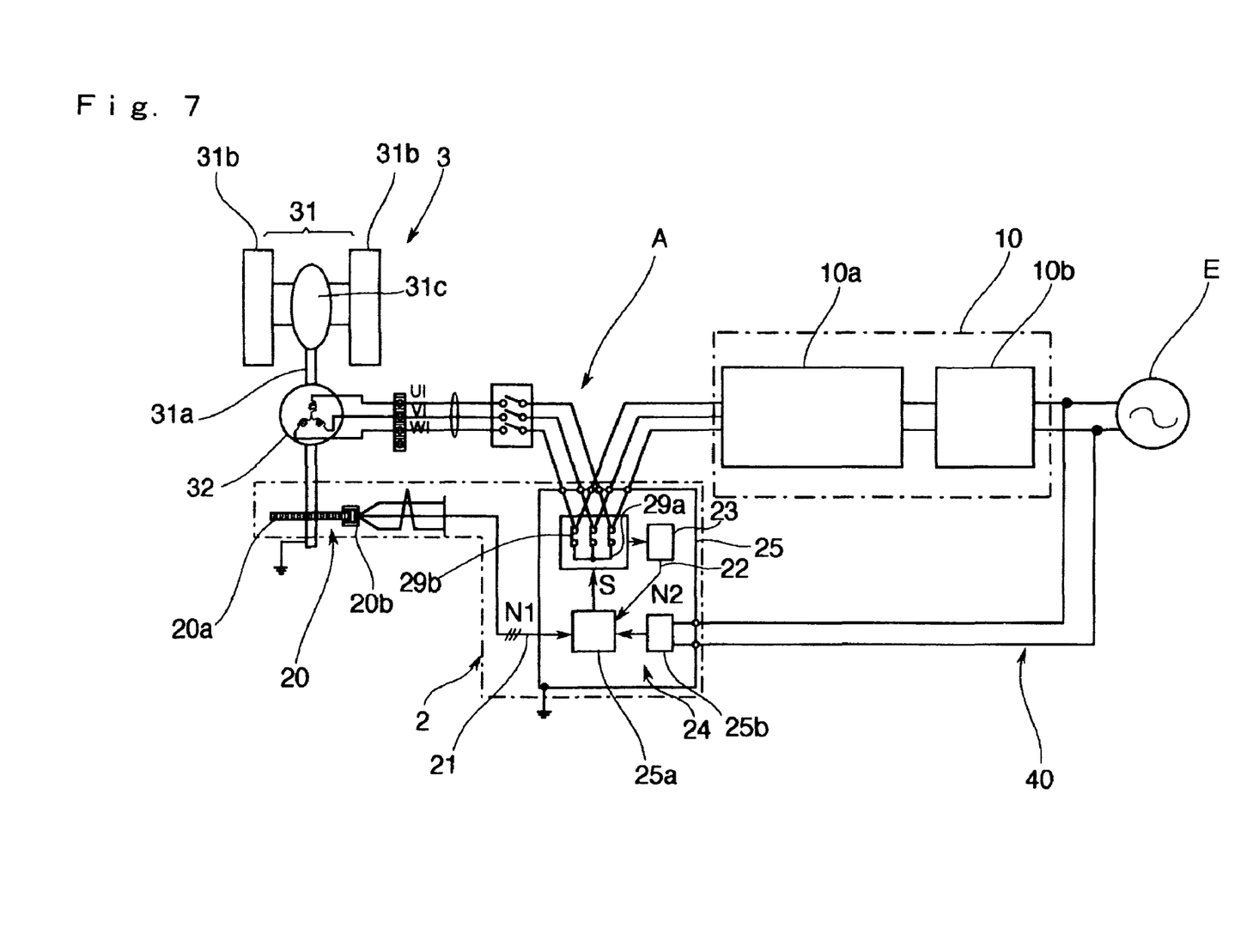
[FIG. 7] It is a view of a system configuration, corresponding to FIG. 1 showing another example of application of the present invention.

Specific configurations of the constituent elements are not limitative to the above embodiments only. For example, a wind power generation system may be occasionally utility-interacted as shown in FIG. 7. A utility interaction is a power supply system of connecting an alternating current power generator 32 for private use, in parallel to a commercially available power source E supplied from electrical business establishment, and then, from either or both of them, supplying power to one's own loading device including the controller 25 via an on-premises power distribution line such as an auxiliary power line 40. In this case, a commercially available power source E is connected to the power line 4 of the generator 32 via a charging management controller 10a and a utility interaction controller 10b which configure a power management device 10. The charging management controller 10a is made of constituent elements which are substantially similar to those of the controller 11; and connects to the commercially available power source E after a direct current voltage obtained after rectified by the charging management controller 11 is converted to an alternating current by mean of an internally provided inverter. This controller is internally provided with a breaker or the like, and is configured so as to ensure safety management such as protecting the generator 32 from being burnt, by interrupting the breaker in case of an excessive load current, for example.

To such a wind power generation system as well, the windmill rotation detection/management device 2 of the present invention can be applied in such a manner that is altogether similar to that in the embodiment. Of course, in this case also, it is possible to configure a windmill rotation detection/management device which is similar to the windmill rotation detection/management device 102 shown in FIG. 6, utilizing a part of the charging management controller 10a.

A configuration of each constituent element can also be variously modified without departing from the spirit of the present invention, by employing a mechanical brake in place of a short circuit, for example.

The invention claimed is:

1. An apparatus comprising:
a first input that receives a first rotational speed information of a windmill mechanically generated by a mechanical rotation detection unit;
a second input that receives a second rotational speed information of the windmill based on an alternating current output of a generator attached to the windmill; and
a controller configured to compare the first and second rotational speed information, to determine whether a difference between the first and second rotational speed information is greater than a predetermined value and to execute a predetermined anomaly processing in response to the difference being greater than the predetermined value,
wherein the controller is configured to perform at least processing of a short circuiting at an output terminal of the generator.

2. The apparatus as set forth in claim 1, wherein the controller determines whether the difference between the first and second rotational speed information is greater than the predetermined value in response to a voltage level of the alternating current output exceeding a determination threshold value.

3. The apparatus as set forth in claim 1, wherein a power line that transmits the alternating current output of the generator is connected to a battery unit or a commercially available power source via a power management device, the apparatus further comprising:
an intermediate terminal connected to the power line between the generator and the power management device; and
a short circuit switch, connected to the intermediate terminal, that short circuits the intermediate terminal in response to an anomaly processing signal output by the controller.

4. The apparatus as set forth in claim 1, wherein a power line that transmits the alternating current output of the generator is connected to a battery unit or a commercially available power source via a power management device,
wherein the power management device receives via an input line the first rotational speed information of the windmill generated by the mechanical rotation detection unit, and
wherein the first input receives the first rotational speed information from the input line of the power management device.

5. The apparatus as set forth in claim 4, wherein the power management device comprises a short circuit switch that short circuits an output terminal of the generator, based upon the first and second rotational speed information, and the controller is configured to output an anomaly processing signal to the short circuit switch to cause the short circuit switch to short circuit the output terminal of the generator.

6. The apparatus as set forth in claim 1, wherein a power line for transmitting the alternating current output of the generator is connected to a battery unit or a commercially available power source via a power management device, the apparatus further comprising:
the mechanical rotation detection unit, which is configured to be retrofitted to the windmill.

7. An apparatus comprising:
a mechanical detection unit that mechanically detects a rotational speed of a windmill and that generates first rotational speed information;
an electrical detection unit that electrically detects the rotational speed of the windmill and that generates second rotational speed information;
a controller configured to apply damping to the windmill, based upon the first and second rotational speed information generated by the mechanical detection unit and the electrical detection unit; and
a display unit that displays an indication that the damping operation is performed,
wherein the controller is configured to perform at least processing of a short circuiting at an output terminal of the generator.

8. A wind power generation system, comprising a windmill and the apparatus as set forth in claim 1.

9. A wind power generation system, comprising a windmill and the apparatus as set forth in claim 7.

10. A method for comprising:
mechanically detecting a rotational speed of a windmill and generating a first rotational speed signal;
electrically detecting the rotational speed of the windmill and generating a second rotational speed signal;
determining, based on the first and second rotational speed signals, whether a difference between the rotational speed mechanically detected and the rotational speed electrically detected is larger than a predetermined value; and
executing a predetermined anomaly processing operation in response to a determination that the difference between the rotational speeds mechanically detected and electrically detected is larger than the predetermined value,
wherein the controller is configured to perform at least processing of a short circuiting at an output terminal of the generator.

11. An apparatus comprising:
means for mechanically detecting a rotational speed of a windmill;
means for electrically detecting the rotational speed of the windmill;
means for determining whether a difference between the rotational speed mechanically detected by the first detecting means and the rotational speed electrically detected by the second detecting means is larger than a predetermined value; and
means for executing a predetermined anomaly processing operation in response to the determining means determining that the difference between the rotational speeds mechanically detected and electrically detected is larger than the predetermined value,
wherein the controller is configured to perform at least processing of a short circuiting at an output terminal of the generator.

* * * * *